United States Patent [19]

Reedy

[11] 4,180,242
[45] Dec. 25, 1979

[54] BOTTOM OPERABLE TANK CAR LADING VALVE WITH MINIMUM SKID PROTECTION FOR RETROFIT

[75] Inventor: Charles E. Reedy, Bridgeton, Mo.

[73] Assignee: ACF Industries, Incorporated, New York, N.Y.

[21] Appl. No.: 958,867

[22] Filed: Nov. 8, 1978

Related U.S. Application Data

[63] Continuation-in-part of Ser. No. 834,655, Sep. 19, 1977.

[51] Int. Cl.² .................................................. F16K 35/00
[52] U.S. Cl. ............................................ 251/144; 251/360; 137/382.5; 137/347; 105/358
[58] Field of Search ................. 251/144, 360; 137/382, 137/382.5, 347, 348, 350; 105/358, 360, 236, 362, 462; 720/85 P

[56] References Cited

U.S. PATENT DOCUMENTS

| 1,484,682 | 2/1924 | Tangerman | 137/348 |
| 3,812,791 | 5/1974 | Barnard | 105/358 X |
| 3,981,481 | 9/1976 | Reedy et al. | 251/144 |

Primary Examiner—William R. Cline
Attorney, Agent, or Firm—Henry W. Cummings

[57] ABSTRACT

In accordance with the present application, a bottom operable tank car valve seat and skid are made in separate pieces. The skid is welded to a skid mounting flange which is located below a tank car universal mounting flange. The skid mounting flange is attached to the universal mounting flange with fasteners. A ring is inserted into a slot provided in the upper, inner surface of the universal flange. Fasteners inserted into existing threaded openings in the universal flange hold the ring in place. A valve seat is mounted on the inner surface of the universal flange and the ring. The ring is held in place with fasteners which extend through the universal flange into the ring. These fasteners also hold in place an operator retainer to maintain the lading valve operator spaced from the walls of the valve seat and vertically fixed. With this arrangement the skid can be removed separately from the outlet. The retainer and the valve operator can be removed separately from the skid, and separately from the lading valve and valve seat with lading in the tank. Furthermore, when the car is empty, the entire assembly other than the universal flange can be disassembled from the bottom without the operator going inside the tank.

4 Claims, 2 Drawing Figures

BOTTOM OPERABLE TANK CAR LADING VALVE WITH MINIMUM SKID PROTECTION FOR RETROFIT

REFERENCE TO RELATED APPLICATION

This application is a continuation-in-part of application Ser. No. 834,655 filed Sept. 19, 1977.

BACKGROUND OF THE INVENTION

Application Ser. No. 834,655 discloses a combination skid and valve seat for a bottom operable tank car lading valve modified for attachment by retrofit to the existing universal flange in railway tank cars.

Openings in the upper surface of the universal flange used primarily to hold a bottom outlet valve in place are provided with a filler. The universal flange includes a slot at its inner end on the inside of the tank. A ring is welded into this slot to support the upper end of the valve seat for the lading valve. Slots are provided in the internal surface of the combination skid and valve seat, and a retainer having outwardly extending circumferential projections extends into the slots. The retainer maintains a lading valve operator vertically fixed and spaced from the walls of the valve seat. First fasteners maintain the combination skid and valve seat attached to the universal flange. Second fasteners constituting a shear plane maintain a depending discharge outlet in engagement with the combination skid and valve seat.

SUMMARY OF THE INVENTION

This application discloses a combination skid and valve seat for a bottom operable tank car lading valve modified for attachment by retrofit to the existing universal flange in railway tank cars. The universal flange includes a slot at its inner end on the inside of the tank. A ring is placed into this slot to support the upper end of the valve seat for the lading valve. Upper fasteners inserted into existing threaded openings in the upper surface of the universal flange hold the ring in place.

In accordance with the present application, the valve seat and skid are made in separate pieces. The skid is welded to a skid mounting flange located below the universal flange, and skid mounting flange fasteners hold the skid mounting flange in engagement with the universal flange.

The seat for the lading valve is held in place with separate fasteners which extend through the universal flange and into the ring. These fasteners also hold in place an operator retainer to maintain the lading valve operator spaced from the walls of the valve seat and vertically fixed.

With this arrangement the skid can be removed separately from the outlet. The retainer and the valve operator can be removed separately from the skid, and separately from the lading valve and valve seat with lading in the tank. Furthermore, when the car is empty, the entire assembly other than the universal flange can be disassembled from the bottom without the operator going inside the tank.

THE DRAWINGS

DESCRIPTION OF PREFERRED EMBODIMENTS

Figure 1:
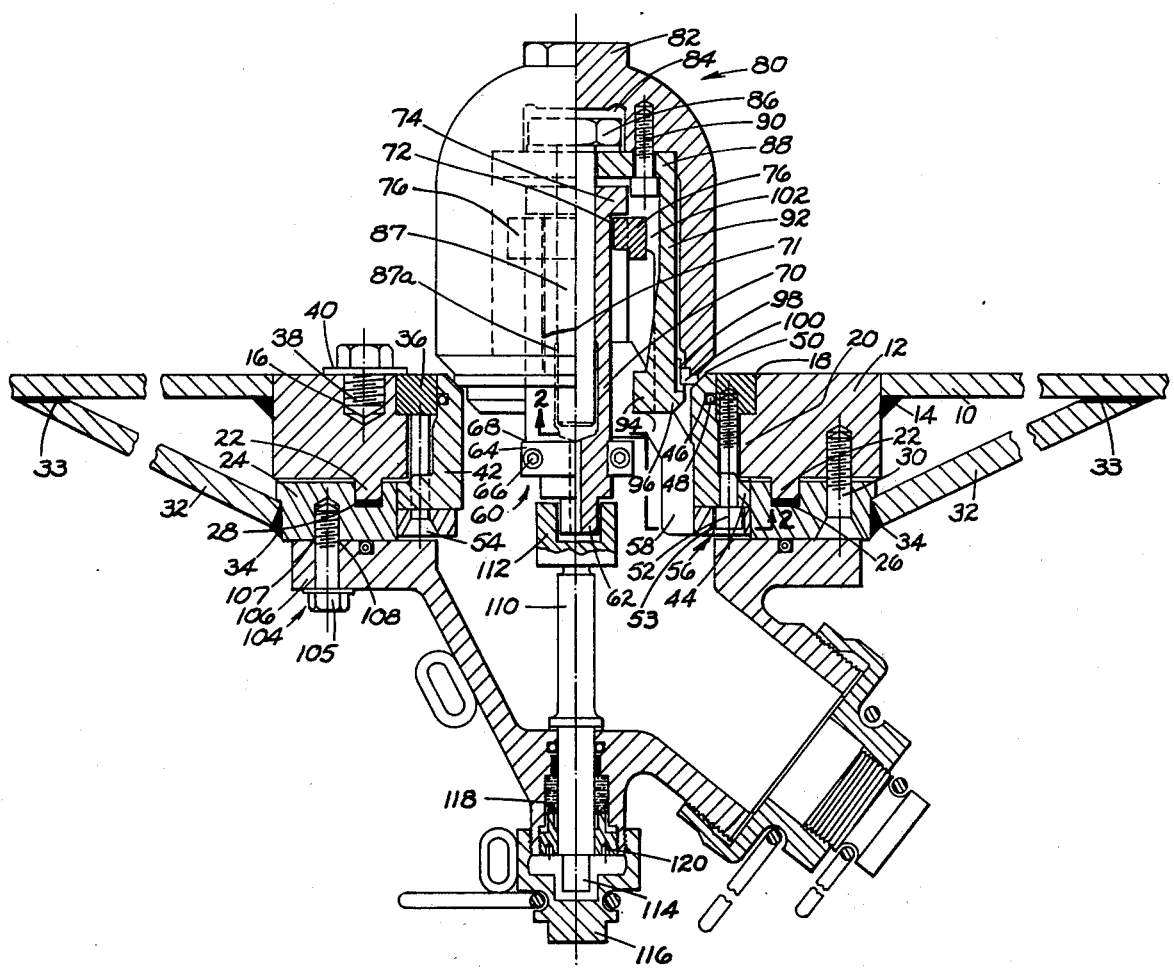
FIG. 1 is a vertical sectional view illustrating the lading valve assembly of the present invention.
Figure 2:
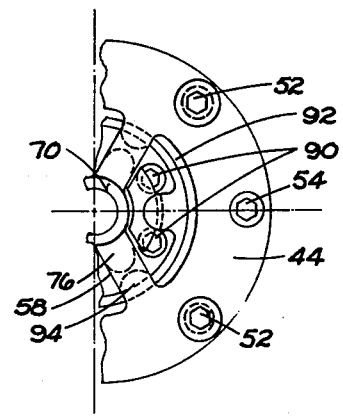
FIG. 2 is a partial horizontal sectional view looking in the direction of the arrows along a line 2—2 in FIG. 1.

As is described in application Ser. No. 834,655 filed Sept. 19, 1977, referred to above and hereby incorporated into the present application by this reference, a tank car bottom 10 has a universal flange 12 welded thereto as indicated at 14. The universal flange includes openings 16 which have conventionally been used to hold a lading valve in place. A circumferential slot 18 is located above the inner portion 20 of the universal flange.

A projection 22 depends from the universal flange. A skid mounting flange 24 includes a slot 26 which receives a seal 28. Fasteners 30 hold flange 24 in engagement with circumferential projection 22, and in engagement with universal flange 12.

A skid 32 preferably of the type described in application Ser. No. 860,987 filed Dec. 15, 1977, hereby incorporated into the present application by this reference, is attached to flange 24 by welding as indicated at 34. As described in said Ser. No. 860,987, the outer end 33 of skid 32 is not welded to the tank shell 10 and thus stress relieving is not required. A ring 36 dimensioned to fit within slot 18 is placed on universal flange portion 20. Cap screws 38 are inserted into openings 16, having cap screw heads 40 which engage and hold in place ring 36.

A valve seat 42 includes a flange portion 44, a slot 46 for receipt of a seal 48, and an inclined machined surface 50 to receive the valve closure. Fasteners 52 extend through an opening 53 in flange portion 44, universal flange portion 20 and into ring 36. Separate countersunk fasteners 54 located on the same bolt circle as fastener 52 hold in place a retainer 56 having upwardly and inwardly directed legs 58. Retainer legs 58 engage a lading valve operator indicated generally at 60. Operator 60 includes a lower connection portion 62 and a split collar 64 held together with fasteners 66 to define a shoulder 68. Operator 60 includes a hollow body portion 70 having internal threads 71, a slot 72 and an upper shoulder 74. An upper stop 76 constructed according to the teachings of application Ser. No. 879,352, filed Feb. 21, 1978, hereby incorporated into the present application by this reference, is inserted into slot 72.

A closure valve 80 includes tool connection portion 82 of hexagon shape to receive a tool for rotation of the closures from the top under emergency conditions. Closure valve 80 is hollow and includes an opening 84 into which is inserted a hexagonal head 86 of operator 60. Hexagonal head 86 is held in place by a horizontal flange portion 88. Depending operator 87 is externally threaded at 87a and engages internal threads 71 for vertical movement.

Fasteners 90 hold flange portion 88 in engagement with valve closure 80. Flange portion 88 includes a depending portion 92 having inwardly directed extensions 94 and an outwardly extending shorter extension 96. Extension 96 has mounted thereon a keeper 98 which supports a valve seal 100. In closed position valve seal 100 seats upon valve seat 50. The cross section of depending portion 92 increases at 102 (FIG. 1).

An unloading housing or spout 104 is attached to nozzle flange 24 with fasteners 105. Fasteners 105 constitute a shear plane either by virtue of notches 107 provided therein generally at the juncture of housing flange portion 106 and nozzle flange 24 indicated at 108, or by virtue of the cross section of the fasteners 106.

Housing 104 may be constructed as described in one or more of U.S. Pat. No. 4,141,535; application Ser. No. 834,655 filed Sept. 19, 1977; or FIG. 5 of application Ser. No. 860,987 filed Dec. 15, 1977, all hereby incorporated into the present application by this reference. As is described in said patent and said applications, housing 104 further includes a vertically extending operator 110 having a connection portion 112 including a square internal cross section which engages square connection portion 62 of operator 60.

The construction of unloading housing or spout 104 and the means by which operator 110 moves valve closure 80 between open and closed positions has been disclosed in U.S. Pat. Nos. 4,124,193 and 4,141,535 and applications Ser. No. 834,655 and Ser. No. 860,987. Briefly, rotation of operator 110 by connecting a suitable tool to a connection portion 114 located a the bottom of the unloading spout, rotates operator 110 and upper operator 60. Rotation of body portion 70 of operator 60 causes valve closure 80 to rotate through engagement of threads 71 and 87a. A cap 116 covers connection portion 114 in transit. A packing 118 is held in place with a packing nut 120. During such rotation inwardly directed projections 94 engage retainer arms 58 after valve seat 50 has been wiped by seal 100. Further rotation of operator 60 causes valve closure 80 to move to vertically the open position. When valve closure reaches the open position, inwardly directed projections 94 engage upper stop 76. Rotation of operator 60 in the opposite direction will again result in initial rotational movement of valve closure 80 alone until projections 94 engage retainer ribs 58. Then the valve closure will move downwardly until such time as seal 100 engages valve seat 50.

Since universal flange 12 extends more than one inch below tank shell 10, a skid 32 is required to comply with American Association of Railroads and Department of Transportation regulations regarding depending projections of tank cars. The skid and the valve seat 44 are constructed in separate pieces; thus, the skid and the skid flange 24 can be quickly attached or removed from the lading valve assembly by removal of unloading spout 104 by removing fasteners 105 and removing skid flange 24, by removing fasteners 30. Furthermore, retainer 56 can be removed by removing countersunk fasteners 54 with lading in the tank. Fasteners 52 maintain valve seat 44 in place supported by universal flange 12 and ring 36. Furthermore, lower operator 110 and upper operator 60 can be removed by removing cap 116, fasteners 66 and split collar 64. When retainer ribs 58 are removed, upper stop 76 can also be rotated out of slot 72. With lading in the tank, fasteners 90 can be removed in the manner described in application Ser. No. 820,522 filed Aug. 1, 1977, hereby incorporated into the present application by this reference, and fixtures attached which can be utilized for the removal of flange portion 88 and closure operator 87. Application Ser. No. 820,552 may be referred to for a description of this procedure.

It will be apparent that removal of the entire operating assembly with lading in the tank while valve closure 80 and valve seat 42 remain in engagement to maintain lading in the tank and prevent escape thereof while the spout and/or operating assembly is removed for repair and/or replacement, is a significant improvement over the combination skid and valve seat described in application Ser. No. 860,987 filed Dec. 15, 1977, because in the Ser. No. 860,987 arrangement the valve seat and the valve skid are not separably removable. Moreover, when the lading is removed from the tank, skid flange 24 and skid 32, retainer 56, valve seat 42, fasteners 52 and ring 36 can all be removed from the bottom. Similarly, valve 80 can be removed from the bottom when ring 36 and fasteners 52 are removed. Thus the operator does not have to go inside the tank to remove a damaged valve body. This constitutes a significant safety hazard as anyone skilled in the art will appreciate. Thus the present application provides an important safety improvement over applications Ser. No. 860,987 and Ser. No. 834,655. In both of these cases, the operator must climb inside the tank to remove the valve closure.

Therefore, it is seen that the present invention constitutes a significant improvement over the related concepts described in application Ser. Nos. 860,987; 834,655 and U.S. Pat. Nos. 4,141,535 and 4,124,193, which is the closest prior art known at the time of preparation of the present application.

What is claimed is:

1. A separately removable skid and valve seat for a bottom operable tank lading valve assembly comprising:

a generally cylindrical universal flange welded to the tank bottom; a lading valve seat located radially within said universal flange; said valve seat being cylindrical including an opening for lading flow and a seat for a valve closure; said lading valve seat having a valve seat flange located below said universal flange; valve seat fasteners extending vertically through said valve seat flange and into said universal flange; a valve closure movable between open and closed position relative to said valve seat; a tank car skid extending longitudinally of the tank and upwardly from said universal flange and abutting the tank bottom at its end portion; said skid having a skid flange located below said universal flange; skid fasteners extending vertically into said skid flange and said universal flange holding said skid flange in engagement with said universal flange; an operator retainer having a retainer flange portion engaging a lower surface of said valve seat; operator retainer fastening means extending through said retainer and into said lading valve seat and holding said retainer in place; said operator retainer extending radially inwardly from said valve seat to maintain a lading valve operator spaced from the walls of said lading valve seat and vertically fixed; an outlet chamber including an opening for lading flow and at least one unloading spout extending below said skid flange and said retainer flange and attached to said skid flange with outlet chamber fasteners extending into said skid flange defining a shear plane, whereby said outlet chamber can be removed by removing said outlet chamber fasteners; said skid can be removed separately from said valve seat by removing said skid fasteners, and whereby said retainer and said valve operator can be removed separately from said skid by removal of said retainer fasteners, and whereby said retainer and said valve operator can be removed separately from said lading valve closure and lading valve seat with lading in the tank.

2. A separately removable skid and valve seat according to claim 1 wherein said valve seat and valve closure may be removed when the car is empty from outside the tank by removing said valve seat fasteners.

3. A separately removable skid and valve seat for a bottom operable tank car lading valve assembly comprising:

a generally cylindrical universal flange welded to the tank bottom including a slot at its upper inner end on the inside of the tank; a ring located in said slot laterally supporting the upper end of a generally cylindrical lading valve seat; said valve seat including an opening for lading flow, a seat for a valve closure and a flange portion; a valve closure movable between open and closed positions relative to said valve seat; upper ring fasteners extending vertically into openings located in the upper surface of the universal flange; said upper ring fasteners engaging said ring to hold said ring in place; a tank car skid extending longitudinally of the tank and upwardly from said universal flange and abutting the tank bottom at its end portion; said skid having a skid flange located below said universal flange; skid fasteners extending vertically into said universal flange holding said skid flange in engagement with said universal flange; valve seat fasteners extending vertically through said valve seat flange portion and into said universal flange and into said ring; an operator retainer extending radially inwardly from said valve seat to maintain a lading valve operator spaced from the walls of said lading valve seat and vertically fixed; said operator retainer having an operator retainer flange portion adjacent said skid flange portion; the lower surface of said operator retainer flange and said skid flange defining a common plane; operator retainer fasteners spaced from said valve seat fasteners also extending through said universal flange; an outlet chamber including an opening for lading flow and at least one unloading spout extending below said skid flange and said operator retainer flange, and attached to said skid flange with outlet chamber fasteners extending vertically into said skid flange defining a shear plane along said common plane; whereby said outlet chamber can be removed by removing said outlet chamber fasteners; said skid can be removed separately from said valve seat by removing said skid flange fasteners, and whereby said retainer and said valve operator can be removed separately from said skid by removing said operator retainer fasteners with lading in the tank, and whereby when the car is empty said valve seat and said valve closure can be removed from the bottom without the operator going inside the tank.

4. A separately removable skid and valve seat according to claim 3 wherein said ring can be removed by removing said upper ring fasteners after said valve seat has been removed.

* * * * *

UNITED STATES PATENT AND TRADEMARK OFFICE
CERTIFICATE OF CORRECTION

PATENT NO. : 4,180,242
DATED : December 25, 1979
INVENTOR(S) : Charles E. Reedy

It is certified that error appears in the above-identified patent and that said Letters Patent are hereby corrected as shown below:

Col. 3, line 17, "a" (second occurrence) should read --at--.

line 27, "to vertically" should read --vertically to--.

line 54, "820,522" should read --820,552--.

Signed and Sealed this

Twenty-second Day of April 1980

[SEAL]

Attest:

SIDNEY A. DIAMOND

Attesting Officer

Commissioner of Patents and Trademarks